United States Patent
Chang et al.

(10) Patent No.: US 9,036,550 B2
(45) Date of Patent: May 19, 2015

(54) METHOD AND TERMINAL FOR DIRECT COMMUNICATION BETWEEN TERMINALS

(75) Inventors: Sung Cheol Chang, Daejeon (KR); Mi Young Yun, Daejeon (KR); Seokki Kim, Daejeon (KR); Won-Ik Kim, Daejeon (KR); Sung Kyung Kim, Daejeon (KR); Eunkyung Kim, Daejeon (KR); Chul Sik Yoon, Daejeon (KR); Kwang Jae Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 210 days.

(21) Appl. No.: 13/617,597

(22) Filed: Sep. 14, 2012

(65) Prior Publication Data
US 2013/0077512 A1    Mar. 28, 2013

(51) Int. Cl.
*H04W 56/00*    (2009.01)
*H04J 3/06*    (2006.01)

(52) U.S. Cl.
CPC ............ *H04W 56/001* (2013.01); *H04J 3/0638* (2013.01)

(58) Field of Classification Search
CPC .... H04W 56/001; H04J 3/0638; H04J 3/0658
USPC ......................................... 370/328, 503, 252
See application file for complete search history.

(56) References Cited

U.S. PATENT DOCUMENTS

| | | | |
|---|---|---|---|
| 2008/0240073 A1* | 10/2008 | Pun et al. ........................ | 370/350 |
| 2009/0122782 A1* | 5/2009 | Horn et al. ...................... | 370/350 |
| 2009/0196277 A1* | 8/2009 | Horn et al. ...................... | 370/350 |
| 2014/0023063 A1* | 1/2014 | Irvine ............................ | 370/350 |

OTHER PUBLICATIONS

Sungcheol Chang et al., "PHY Control Operations for Talk-around Direct Communications", IEEE 802.16 Broadband Wireless Access Working Group, IEEE C802.16n-11/0155, Sep. 14, 2011.
Sungcheol Chang et al., "Modification of One-Hop Operations for Talk-around Direct Communications", IEEE 802.16 Broadband Wireless Access Working Group, IEEE C802.16n-11/0240, Oct. 31, 2011.
Sungcheol Chang et al., "Text Proposals of PHY Control Structure for 16n Direct Communication", IEEE 802.16 Broadband Wireless Access Working Group, IEEE C802.16n-11/0072, May 9, 2011.

(Continued)

*Primary Examiner* — Min Jung
(74) *Attorney, Agent, or Firm* — Rabin & Berdo, P.C.

(57) ABSTRACT

A direct communication method between terminals is provided. When a terminal receives a plurality of synchronization information parts, the terminal selects synchronization information to acquire a reference time among the plurality of synchronization information parts according to a priority. Here, the priority is an order of first synchronization information that is received from a base station, second synchronization information that is received from a global positioning system (GPS), and third synchronization information that is received from a terminal in which a hop count from the base station or the GPS is small.

9 Claims, 13 Drawing Sheets

(56) References Cited

OTHER PUBLICATIONS

Sungcheol Chang et al., "Message Confirm Indication in response to MAC control message in talk-around direct communication", IEEE 802.16 Broadband Wireless Access Working Group, IEEE 802.16-12-0325-00-010a, May 4, 2012.

Sungcheol Chang et al., "Clarification of HARQ parameters in talk-around direct communication", IEEE 802.16 Broadband Wireless Access Working Group, IEEE 802.16-12-0323-00-010a, May 4, 2012.

Sungcheol Chang et al., "Clarification of talk-around direct communication", IEEE 802.16 Broadband Wireless Access Working Group, IEEE 802.16-12-0060-00-010a, Jan. 9, 2012.

Sungcheol Chang et al., "Synchronization of transmission time on dedicated channel in talk-around direct communications", IEEE 802.16 Broadband Wireless Access Working Group, IEEE 802.16-12-0324-00-010a, May 4, 2012.

IEEE P802.16.1a/D3, Jun. 2012.

\* cited by examiner

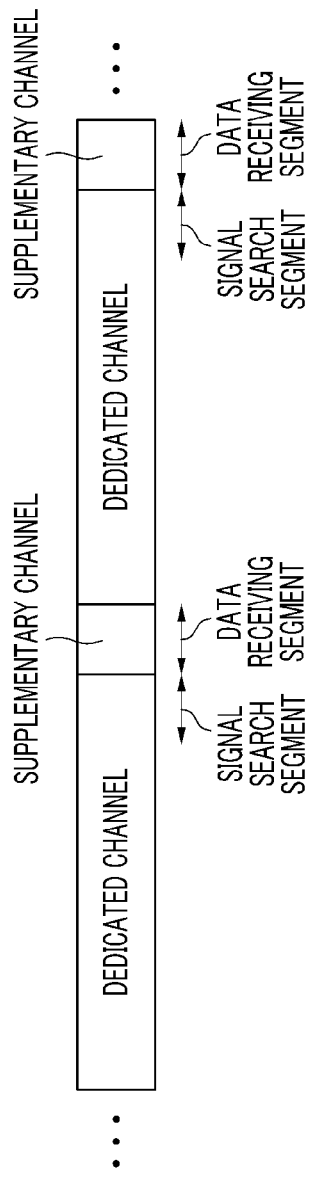
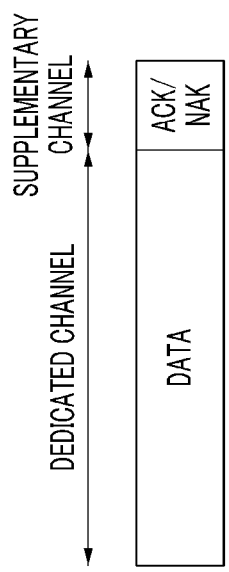

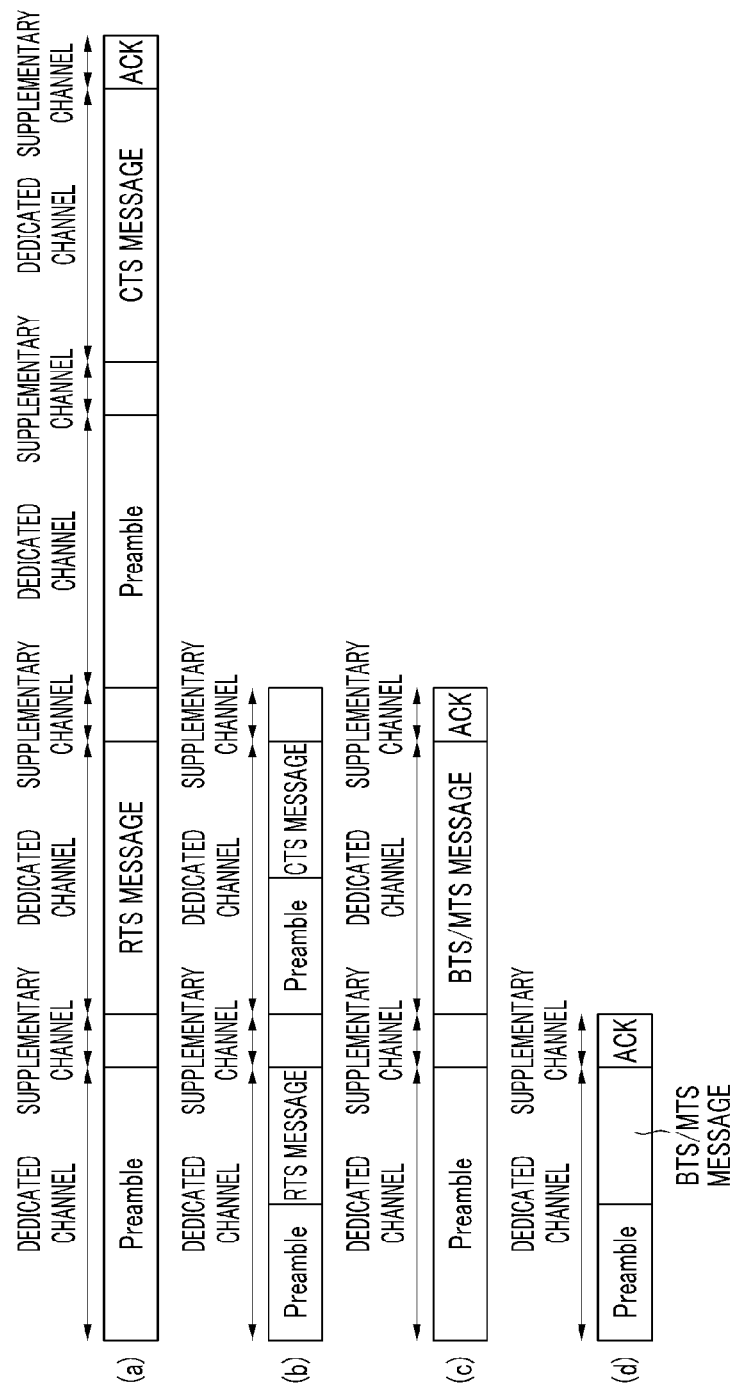

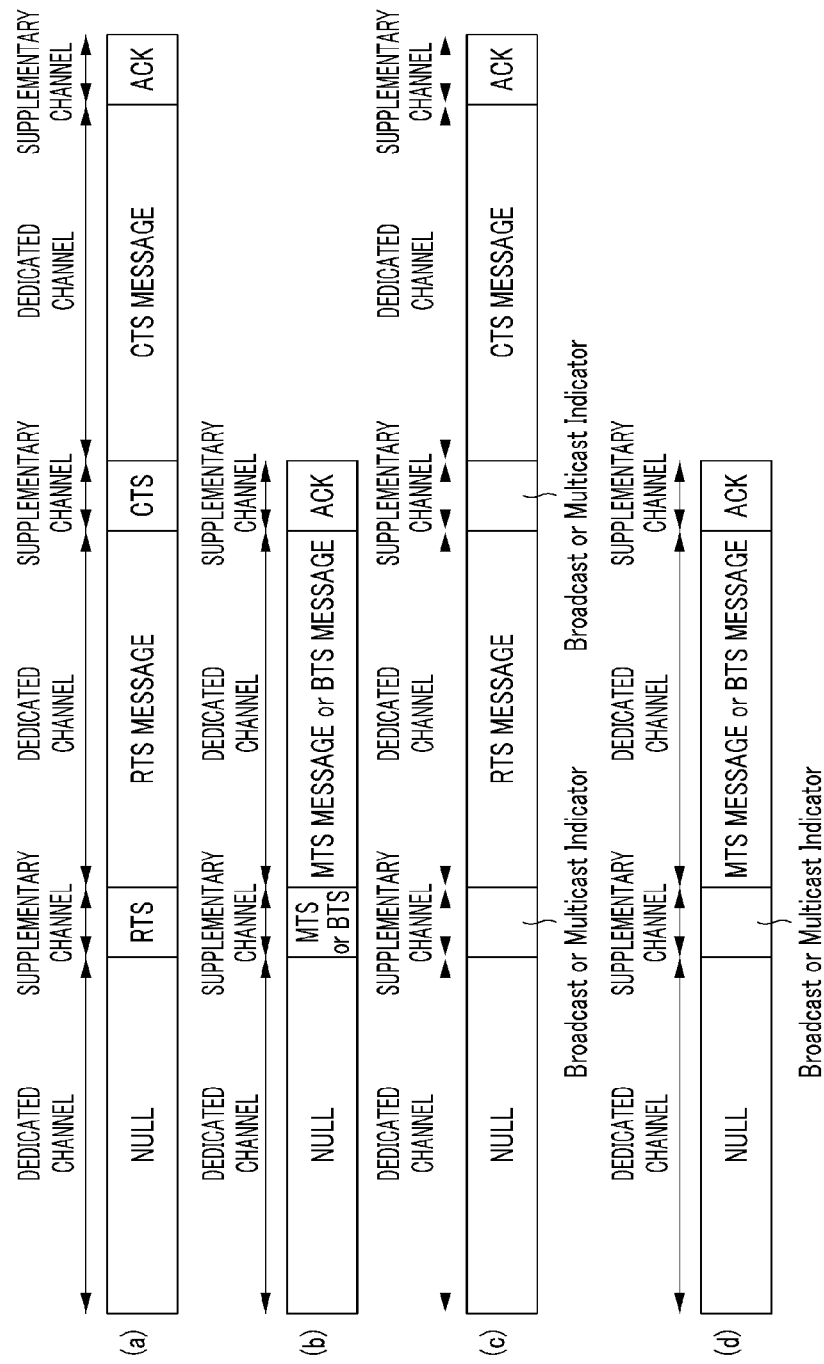

METHOD AND TERMINAL FOR DIRECT COMMUNICATION BETWEEN TERMINALS

CROSS-REFERENCE TO RELATED APPLICATION

This application claims priority to and the benefit of Korean Patent Application Nos. 10-2011-0092607, 10-2011-0113004, 10-2012-0002756, 10-2012-0075229, and 10-2012-0101914 filed in the Korean Intellectual Property Office on Sep. 14, 2011, Nov. 1, 2011, Jan. 10, 2012, Jul. 10, 2012, and Sep. 14, 2012, respectively, the entire contents of which are incorporated herein by reference.

BACKGROUND OF THE INVENTION (a) Field of the Invention

The present invention relates to a method of performing direct communication between terminals and a terminal for supporting the same.

(b) Description of the Related Art

Under a frame structure of infrastructure communication (i.e., cellular communication) between a base station and a terminal, a portion of a resource for cellular communication is used by direct communication terminals that perform direct communication between terminals.

In general, as a wireless communication resource for direct communication between terminals, a partial resource of an uplink within an infrastructure communication (cellular communication) frame is allocated, and a base station and a terminal participating in infrastructure communication do not use a resource that is allocated to direct communication between terminals. In this way, in an allocated resource, terminals perform direct communication between terminals as a direct communication protocol and procedure.

When a partial resource of an infrastructure communication frame is allocated for direct communication between terminals, a signal of a terminal that performs cellular communication and a signal of a terminal that performs direct communication may exist together within cell coverage of a base station. Therefore, synchronization acquisition between terminals that perform direct communication should be performed before data reception, and a detailed method thereof is requested.

SUMMARY OF THE INVENTION

The present invention has been made in an effort to provide a method of performing direct communication between terminals and a terminal for supporting the same having advantages of acquiring synchronization in direct communication between terminals.

An exemplary embodiment of the present invention provides a method of communicating with a terminal. The method includes: receiving a plurality of synchronization information parts; selecting synchronization information to acquire a reference time among a plurality of synchronization information parts according to a priority; and acquiring the reference time through the acquired synchronization information, wherein the priority is an order of a first synchronization information that is received from a base station, a second synchronization information that is received from a global positioning system (GPS), and a third synchronization information that is received from a terminal in which a hop count from the base station or the GPS is small.

The third synchronization information may be synchronization information that is received from a terminal having high received signal strength when the hop counts are the same.

A next order of the third synchronization information may be fourth synchronization information that is received from a terminal having a small hop count among synchronization information including a reference that the terminal randomly selects.

A next order of the third synchronization information may be fourth synchronization information that is received from a terminal having high received signal strength when hop counts are the same among synchronization information including a reference time that the terminal randomly selects.

The method may further include acquiring a reference time by selecting a regional time of a terminal itself when the first to fourth synchronization information parts are not acquired within a predetermined time.

The synchronization information may include a type of the reference time, the hop count, and the received signal strength.

Another embodiment of the present invention provides a method of communicating with a terminal. The method includes: acquiring a reference time through a first synchronization information; measuring received signal strength of the first synchronization information; receiving a second synchronization information that is larger by one hop count than a hop count corresponding to the first synchronization information; and transmitting a third synchronization information when the received signal strength is smaller than a strength field value of a received signal that is included in the second synchronization information. The method may further include transmitting the third synchronization information when the second synchronization information is not received.

The strength field value of the received signal may be received signal strength of synchronization information that a terminal that transmits the second synchronization information uses for acquiring synchronization information.

The third synchronization information may include a hop count, received signal strength, and a reference time type.

Yet another embodiment of the present invention provides a method of communicating with a terminal. The method includes: transmitting a preamble to a first terminal through a dedicated channel in a first frame of a resource that is allocated for direct communication with the first terminal; transmitting an RTS message to the first terminal through the dedicated channel in a next second frame adjacent to the first frame; receiving a preamble from the first terminal of the singular number through the dedicated channel in a next third frame adjacent to the second frame and receiving a CTS message from the first terminal of the singular number through the dedicated channel in a fourth frame adjacent to the third frame, when the first terminal is the singular number; and transmitting a data packet to the first terminal of the singular number through the dedicated channel, when the CTS message is received. The method may further include receiving an ACK message from the first terminal through a supplementary channel corresponding to the dedicated channel, when a plurality of first terminals exist; and transmitting a data packet to the plurality of first terminals through the dedicated channel, when the ACK message is received.

The RTS message and the CTS message may include a MAC control message.

The method may further include transmitting a send indicator to the first terminal through a supplementary channel corresponding to the dedicated channel in the first frame.

The method may further include receiving a send indicator from the first terminal through a supplementary channel corresponding to the dedicated channel in the third frame.

The method may further include: receiving a NAK message from the first terminal through a supplementary channel when an error occurs in the packet; and retransmitting the packet in which an error has occurred to the first terminal.

The method may further include: receiving channel quality information (CQI) from the first terminal through a supplementary channel corresponding to the dedicated channel; transmitting a modulation and coding scheme (MCS) change command message to the first terminal, when an MCS level is changed; receiving an MCS change confirm message from the first terminal through a feedback channel of the MCS change command message; and changing the MCS level.

The first terminal may decode a data signal in an MCS level before being changed when decoding of a data signal in the changed MCS level has failed.

Yet another embodiment of the present invention provides a terminal. The terminal includes: a radio frequency (RF) module; and a processor, wherein the processor selects synchronization information to acquire a reference time according to a priority among a plurality of synchronization information parts and acquires the reference time through the selected synchronization information, and the priority is an order of first synchronization information that is received from a base station, second synchronization information that is received from a GPS, and third synchronization information that is received from a terminal in which a hop count from the base station or the GPS is small.

Yet another embodiment of the present invention provides a terminal. The terminal includes an RF module and a processor, wherein the processor is set to transmit a preamble and an RTS message to the first terminal in two adjacent frames that are allocated for direct communication with a first terminal, and is set to receive a preamble and a CTS message from the first terminal in next two frames adjacent to the two frames.

BRIEF DESCRIPTION OF THE DRAWINGS

FIG. 5A is a diagram illustrating an example in which a dedicated channel and a supplementary channel are mapped one-to-one, and FIG. 5B is a diagram illustrating information that is included in a dedicated channel and a supplementary channel when a terminal transmits.

FIG. 6 is a diagram illustrating an exemplary embodiment that occupies a resource of a dedicated channel for competition transmission.

FIG. 7 is a diagram illustrating another exemplary embodiment that occupies a resource of a dedicated channel for competition transmission.

DETAILED DESCRIPTION OF THE EMBODIMENTS

Figure 1:
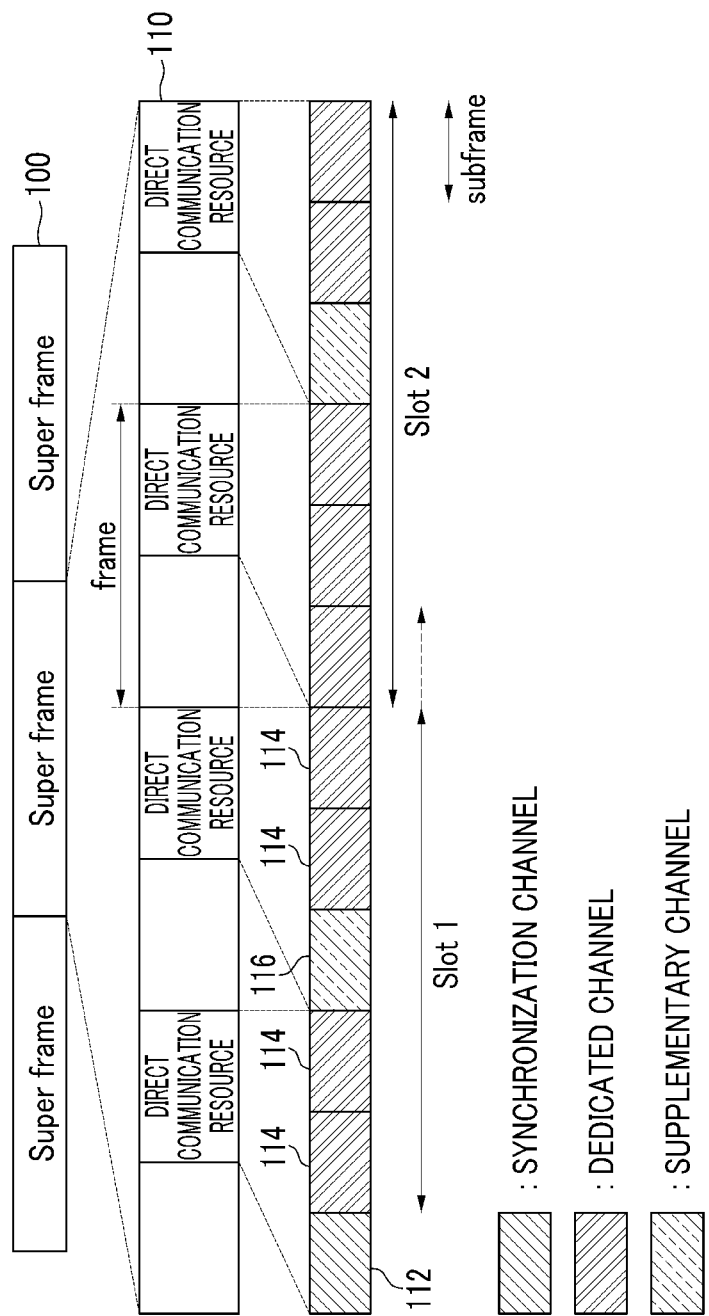
FIG. 1 is a diagram illustrating a frame structure including a resource for direct communication between terminals according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a mobile station (MS) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the terminal, the MT, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a function of a BS, and a high reliability relay station (HR-RS) that performs a function of a BS, and may include an entire function or a partial function of the ABS, the node B, the eNodeB, the AP, the RAS, the BTS, the MMR-BS, the RS, and the HR-RS.

Hereinafter, a frame structure that is used for a direct communication method between terminals according to an exemplary embodiment of the present invention will be described with reference to FIG. 1.

FIG. 1 is a diagram illustrating a frame structure including a resource for direct communication between terminals according to an exemplary embodiment of the present invention.

As shown in FIG. 1, a super frame 100 includes a plurality of frames (e.g., 4 frames), and each frame includes a resource 110 for direct communication between terminals. A resource for direct communication between terminals may be allocated over a plurality of subframes (e.g., 3 subframes) on a frame basis.

The resource 110 for direct communication includes at least one of a synchronization channel 112, a dedicated channel 114, and a supplementary channel 116. Here, a data portion is formed with a slot 1 and a slot 2, and the slot 1 is formed with the dedicated channel 114 and the supplementary channel 116. The dedicated channel 114 and the supplementary channel 116 are in a one-to-one corresponding relationship, and by reflecting the relationship, a supplementary channel of the slot 1 is related to a dedicated channel of a slot 2 of a previous frame, and a supplementary channel of the slot 2 is related to a dedicated channel of the slot 1 within the same frame.

The number of dedicated channels varies according to the number of uplink subframes that are allocated to direct communication. As an example, when the number of uplink subframes within a 5 ms frame of an IEEE P802.16.1a specification is 3, the number of dedicated channels that perform direct communication becomes 9.

The synchronization channel 112 includes a preamble portion and a broadcasting portion. The preamble portion is a portion in which a preamble of a sharing pattern between a transmitting terminal and a receiving terminal is transmitted, and the broadcasting portion is a portion in which the transmitting terminal transmit in a message form and in which the receiving terminal acquires information of the transmitting terminal.

According to an exemplary embodiment of the present invention, a plurality of terminals propagate a reference time with a distributed method and transmit synchronization, and this will be described in detail with reference to FIGS. 2 to 4.

In direct communication according to an exemplary embodiment of the present invention, a frame reference time (i.e., a synchronization time) is i) a base station frame reference time or ii) an absolute reference time by a global positioning system (GPS). When the above two reference times are not used, iii) a reference time of direct communication frame synchronization information when a terminal transmits may be used. When a reference time of the i) to iii) is not used, iv) a frame reference time when a terminal is independently provided is used. Here, an absolute reference time by a GPS is set to correspond to a frame reference time when a base station is used, and a frame reference time when a terminal is independently provided uses a reference that the terminal randomly selects.

In direct communication according to an exemplary embodiment of the present invention, in a method of transmitting a reference time, a reference time of the base station frame or an absolute reference time from a GPS is propagated to adjacent terminals through the synchronization channel 112.

Figure 2:
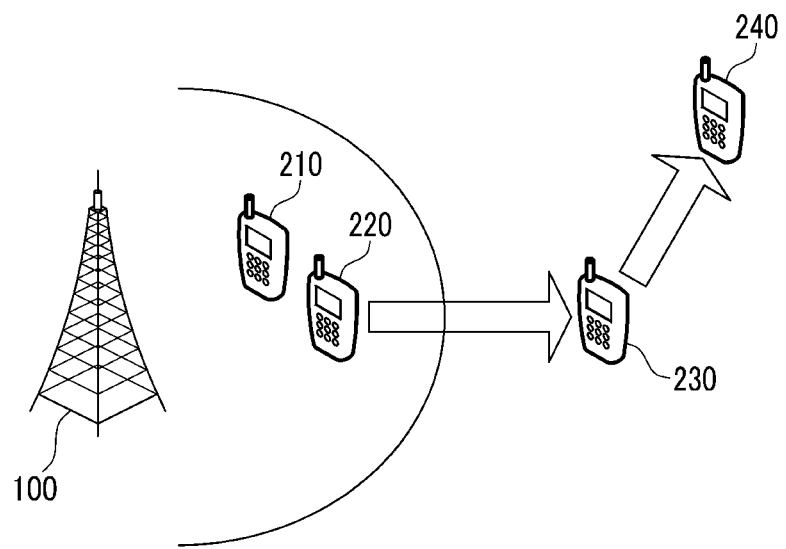
FIG. 2 is a diagram illustrating an example in which a terminal having acquired a reference time of a base station frame propagates synchronization information to an adjacent terminal.

FIG. 2 is a diagram illustrating an example in which a terminal having acquired a reference time of a base station frame propagates synchronization information to an adjacent terminal.

In FIG. 2, terminals 210 and 220 are within a service area of the base station 100, and terminals 230 and 240 are outside a service area of a base station 100. Here, it is assumed that the terminal 210 is selected as a terminal that acquires and transmits a reference time of a base station frame.

The terminal 220 within a service area of the base station 100 propagates a reference time (a reference time of a base station frame) to the terminal 230 through the synchronization channel 112 of direct communication, and the terminal 230 propagates the reference time to the synchronization channel 112 and to the terminal 240. Finally, the terminal 240 acquires a reference time of the base station frame through the synchronization channel 112 outside a base station service area.

When a terminal that participates in direct communication receives a plurality of synchronization information, the terminal selects a reference time of each terminal based on a priority to be described later between reference times.

Here, when the terminal selects a reference time through a priority, available information includes a reference time type, a reference time transmitter identifier, a hop count, and reference signal strength.

As of the reference time type, a GPS time, a base station frame reference time, and a regional time are used. The reference time transmitter identifier represents a reference time as a subject, the GPS and the regional time become an identifier of the terminal, and the base station frame reference time becomes a base station identifier. The hop count (propagation number of hops) is the number of hops in which a reference time is propagated, and such a hop count is included and transmitted in synchronization information. The reference signal strength represents strength of a synchronization information signal that the terminal receives.

A priority 1 is a base station frame reference time and is a reference time that is acquired from a synchronization signal that the terminal directly receives from the base station. The frame reference time is synchronized to correspond between base stations.

A priority 2 is an absolute reference time provided by a GPS, and is a reference time that is acquired from a GPS signal that a terminal directly receives from the GPS. Because the base station frame reference time is synchronized with a GPS time, the terminal operates and acquires a base station frame reference time through an absolute reference time from the GPS.

As a priority 3, the terminal acquires a reference time through synchronization information having a small hop count based on a reference time of the priority 1 or the priority 2 among synchronization information that is acquired in a synchronization channel. When the terminal receives transmission of synchronization information having the same hop count, the terminal acquires a reference time based on synchronization information having high reference signal strength.

As a priority 4, the terminal acquires a reference time through synchronization information having a small hop count among synchronization information including a reference time that is randomly selected by the terminal. When the terminal receives transmission of synchronization information having the same hop count, the terminal acquires a reference time based on synchronization information having high reference signal strength. Here, when the terminal does not quickly acquire a reference time through received synchronization information, a regional time of the terminal may be selected.

As a final priority 5, when the terminal does not receive synchronization information for a predetermined time, a regional time of the terminal is selected.

In the above-described priorities 1 to 5, the terminal having received the same priority may randomly select one of the priorities.

Figure 3:
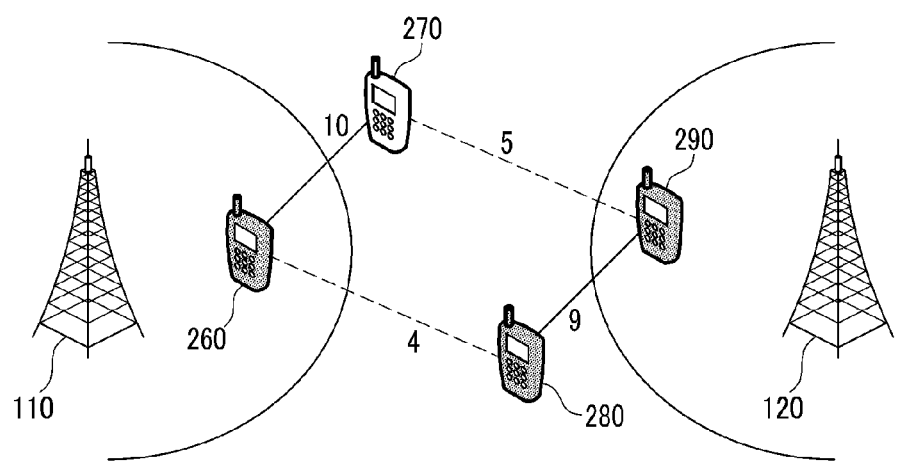
FIG. 3 is a diagram illustrating an example in which a terminal selects a reference time based on a priority.

FIG. 3 is a diagram illustrating an example in which a terminal selects a reference time based on a priority.

In FIG. 3, a terminal 260 is in a service area of a base station 110, and a terminal 290 is in a service area of a base station 120. Terminals 270 and 280 are outside a service area of the base stations 110 and 120. In FIG. 3, a portion that is represented by numerals between terminals represents reference signal strength of each terminal, and it is assumed that the terminal 270 receives a signal from the terminal 260 and a terminal 290, and the terminal 280 receives a signal from the terminal 260 and the terminal 290.

First, a method in which the terminal 270 and the terminal 280 acquire a reference time through the above-described priority will be described.

Strength of a reference signal that the terminal 270 receives from the terminal 260 is 10, and the terminal 270 receives synchronization information in which a hop count from the base station is 1 from the terminal 260. Strength of a reference signal that the terminal 270 receives from the terminal 290 is 5, and the terminal 270 receives synchronization information in which a hop count from the base station is 1 from the terminal 260. In such a case, because the terminal 270 has the same hop count according to a rule of the above-described priority 3, the terminal 270 acquires synchronization information from a signal having high reference signal strength, and thus the terminal 270 acquires a reference time through synchronization information that is received from the terminal 260.

The terminal 280 receives synchronization information in which strength of a reference signal that is received from the terminal 260 is 4 and in which a hop count from the base station is 1 from the terminal 260. The terminal 280 receives synchronization information in which strength of a reference signal that is received from the terminal 290 is 9 and in which a hop count from the base station is 1 from the terminal 290. In such a case, because the terminal 280 has the same hop count according to a rule of the above-described priority 3, the terminal 280 acquires synchronization information from a signal having high reference signal strength, and thus the terminal 270 acquires a reference time through synchronization information that is received from the terminal 290.

Because the terminal 260 is in a service area of the base station 110, the terminal 260 corresponds to the above-described priority 1 and thus acquires a reference time through synchronization information that is received from the base station 110. Because the terminal 290 is in a service area of the base station 120, the terminal 290 corresponds to the above-described priority 1 and thus acquires a reference time through synchronization information that is received from the base station 120.

In the foregoing description, a method in which a terminal acquires a reference time based on a priority has been described, and hereinafter, a method in which a terminal is selected as a terminal that transmits synchronization information including a reference time will be described.

As a rule in which a terminal transmits synchronization information (including a reference time), i) when a terminal does not receive synchronization information having a hop count (hop count+1) larger by 1 than a hop count of synchronization information that is referred for acquiring a reference time (i.e., when a receiving level is a predetermined reference or less) or ii) when a terminal receives synchronization information having a hop count (hop count+1) larger by 1 than a hop count of synchronization information that is referred for acquiring a reference time and when reference signal strength of synchronization information that is referred for acquiring a reference time is smaller than a reference signal strength field value including the synchronization information, the terminal is selected as a terminal for transmitting synchronization information. That is, when the terminal satisfies a condition of the i) or ii), the terminal is selected as a terminal to transmit synchronization information and transmits the synchronization information.

Figure 4:
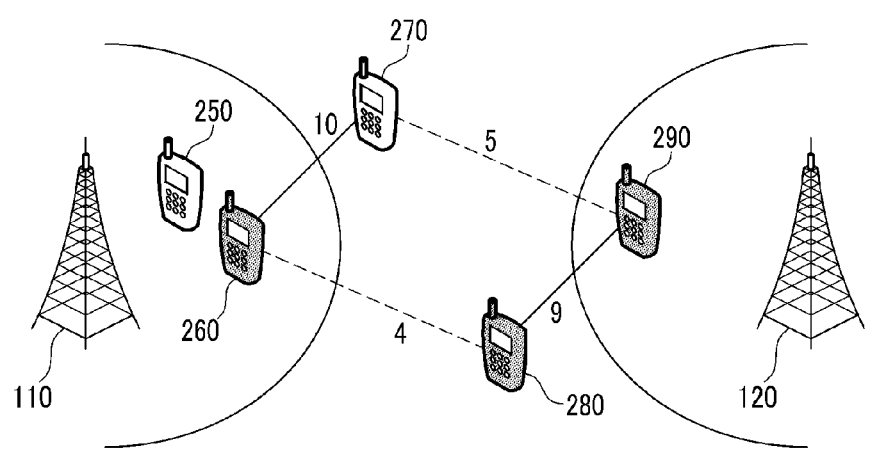
FIG. 4 is a diagram illustrating an example in which a terminal is selected as a terminal that transmits synchronization information.

FIG. 4 is a diagram illustrating an example in which a terminal is selected as a terminal that transmits synchronization information.

In FIG. 4, a state of each terminal is similar to a state of each terminal of FIG. 3 except that a terminal 250 is added. That is, the terminals 250 and 260 are in a service area of the base station 110, and the terminal 290 is in a service area of the base station 120. The terminals 270 and 280 are outside a service area of the base stations 110 and 120. In FIG. 4, a portion that is represented with numerals between terminals represents strength of a received signal that is received by each terminal.

First, a case of selecting as a terminal that transmits synchronization information in the terminal 250 and the terminal 260 will be described. Because the terminal 250 and the terminal 260 have the same hop count and the terminal 260 is located further than the terminal 250 from a base station, the terminal 260 transmits a relatively smaller value in a propagating reference signal strength value than that of the terminal 250 and thus the terminal 260 finally becomes a terminal that transmits synchronization information. The terminal 250 stops transmission of synchronization information.

In more detail, it is determined that the terminal 250 corresponds to a case of the i) when the terminal 250 does not receive synchronization information having a hop count (hop count+1) larger by 1 than a hop count of synchronization information that is referred for acquiring a reference time and thus it is assumed that the hop count is set to 1 (hop count=1) and synchronization information is transmitted. In this case, the terminal 260 determines that reference signal strength (i.e., strength of a reference signal from the base station 110) of synchronization information that is referred for acquiring a reference time thereof is smaller than reference signal strength that is included within synchronization information that receives from the terminal 250, and thus the terminal 260 is selected as a terminal for transmitting synchronization information. That is, the terminal 260 corresponds to a case of the ii) and thus the terminal 260 is selected as a terminal for transmitting synchronization information.

The terminal 250 determines that reference signal strength (i.e., strength of a reference signal from the base station 110) of synchronization information that is referred for acquiring a reference time thereof is larger than reference signal strength that is included within synchronization information that is transmitted by the terminal 260 (the terminal 250 does not satisfy a condition of the ii)), and thereafter, the terminal 250 does not transmit synchronization information. That is, the terminal 250 is first selected as a terminal for transmitting synchronization information, but does not transmit synchronization information later.

In a situation in which the terminal 260 and the terminal 290 transmit synchronization information, the terminal 270 and the terminal 280 compete and the terminal 260 is finally selected as a terminal for transmitting synchronization information, as described above. That is, when the terminal 270 and the terminal 280 have the same hop count and the terminal 270 transmits synchronization information, the terminal 270 transmits reference signal strength 10, and when the terminal 280 transmits synchronization information, the terminal 280 transmits reference signal strength 9, and thus the terminal 280 becomes a terminal to transmit synchronization information. That is, the terminal 280 satisfies a condition of the ii) and is thus selected as a terminal for transmitting synchronization information, and the terminal 270 does not satisfy a condition of the ii) and thus does not transmit synchronization information.

When the terminal directly receives and repropagates a GPS synchronization signal (Reference Time Type=0b00, hop count=1), the terminal sets a "reference signal strength" value of synchronization information to 0xFF and transmits the value. When an adjacent terminal receives such a signal (i.e., when a GPS synchronization signal is repropagated and received), the terminal stops transmission of the synchronization signal.

When the terminal is selected as a terminal to transmit synchronization information through a synchronization channel, the terminal includes a hop count, reference signal strength, and a reference time type in the synchronization information and transmits the synchronization information. Here, the hop count increases by 1 in every hop. A terminal that is selected as a terminal for transmitting synchronization information randomly selects a slot having no signal in a synchronization channel by measurement and periodically transmits synchronization information through the selected channel. The synchronization channel that transmits synchronization information includes a synchronization channel preamble (SYNC-CH preamble) and a synchronization channel message (SYNC-CH message). Here, the SYNC-CH message corresponds to a broadcasting portion that is described above.

Table 1 is a format of a SYNC-CH message. In Table 1, a frame structure represents a kind of a resource used in a direct communication frame of 20 ms.

TABLE 1

SYNC-CH message format

| Field | Size (bits) | Value/Description | Condition |
|---|---|---|---|
| Reference time type | 2 | Indicate type of the source clock for the Reference Synchronization channel. 0b00: HR-BS 0b01: GPS 0b10: HR-MS 0b11: Reserved | |
| Hop count | 2 | Indicate the hop counter of the reference synchronization channel from source clock. If an HR-MS receives signal from HR-BS, the Hop counter in Synchronization channel IE sent by the HR-MS is 1. | |
| Reference signal strength | 8 | The reference signal strength indicates the received signal strength of the reference preamble sequences for synchronization channel, which are measured by the HR-MS from these preamble sequences. An HR-MS which receives GPS synchronization signal and propagate it with hop count = 1 on the direct communication synchronization channel should set the 'Reference Signal Strength' = 0xFF. The value shall be interpreted as an unsigned byte with units of 0.25 dB, e.g., 0x00 is interpreted as −103.75 dBm. An HR-MS shall report values in the range from −103.75 dBm to −40 dBm. | |
| Frame structure | 4 | Indicate the usage of direct communication resources for direct communication frame. Bit 0: common direct mode zone extended (CDMZ-E) Values from Bit 1 to Bit 3 indicate type of cell specific direct mode zone (CSDMZ). 0b000-0b111: Reserved | |
| CRC | 16 | | |

FIG. 5A is a diagram illustrating an example in which a dedicated channel and a supplementary channel are mapped one-to-one, and FIG. 5B is a diagram illustrating information that is included in a dedicated channel and a supplementary channel when a terminal transmits.

As shown in FIG. 5A, the supplementary channel corresponds to the dedicated channel one-to-one and is separated by a time from the dedicated channel. Such a supplementary channel performs a function of supplementing the dedicated channel. In order to avoid interference between terminals to be described later, the terminal detects whether a signal exists in an entire dedicated channel or a portion of a dedicated channel, and receives data through an entire supplementary channel or detects whether a signal exists in an entire supplementary channel.

As shown in FIG. 5B, a transmitting terminal transmits data through the dedicated channel and transmits ACK or NAK in response thereto through the supplementary channel. Here, ACK represents that a receiving terminal successfully receives data, and NAK represents that a receiving terminal does not receive data.

According to an exemplary embodiment of the present invention, the terminal uses competition transmission as a method of first occupying a resource of a dedicated channel. Hereinafter, a method of occupying a resource of a dedicated channel for competition transmission will be described with reference to FIGS. 6 and 7.

FIG. 6 is a diagram illustrating an exemplary embodiment that occupies a resource of a dedicated channel for competition transmission.

As shown in FIG. 6, the terminal transmits data from a dedicated channel portion in a frame unit. As shown in FIGS. 6A and 6C, the terminal transmits a preamble to a specific frame and transmits a packet (data) to a next frame. The packet may use request to send (RTS), clear to send (CTS), multicast to send (MTS), and broadcast to send (BTS) messages. As shown in FIGS. 6B and 6D, the terminal transmits a preamble and a packet to a specific frame. That is, a preamble and a packet are transmitted to one frame. The packet may use the request to send (RTS), clear to send (CTS), multicast to send (MTS), and broadcast to send (BTS) messages.

FIG. 7 is a diagram illustrating another exemplary embodiment that occupies a resource of a dedicated channel for competition transmission.

As shown in a and b of FIG. 7, as a method that can identify a packet kind in a supplementary channel, an identifier RTS, CTS, MTS, or BTS representing a packet kind is included in the supplementary channel, and as a packet, RTS, CTS, MTS, and BTS messages are included in a dedicated channel. Here, different terminals may transmit the RTS message and the CTS message. For direct communication, the terminal may directly transmit the MTS message and the BTS message.

As shown in c and d of FIG. 7, a broadcast or multicast indicator may be included in the supplementary channel, and in the dedicated channel, RTS, CTS, MTS, and BTS messages may be included. The receiving terminal receives a supplementary channel and periodically performs reception. The terminal, having received an indicator through the supplementary channel, transmits the RTS, CTS, MTS, and BTS messages through the dedicated channel.

Figure 8A:
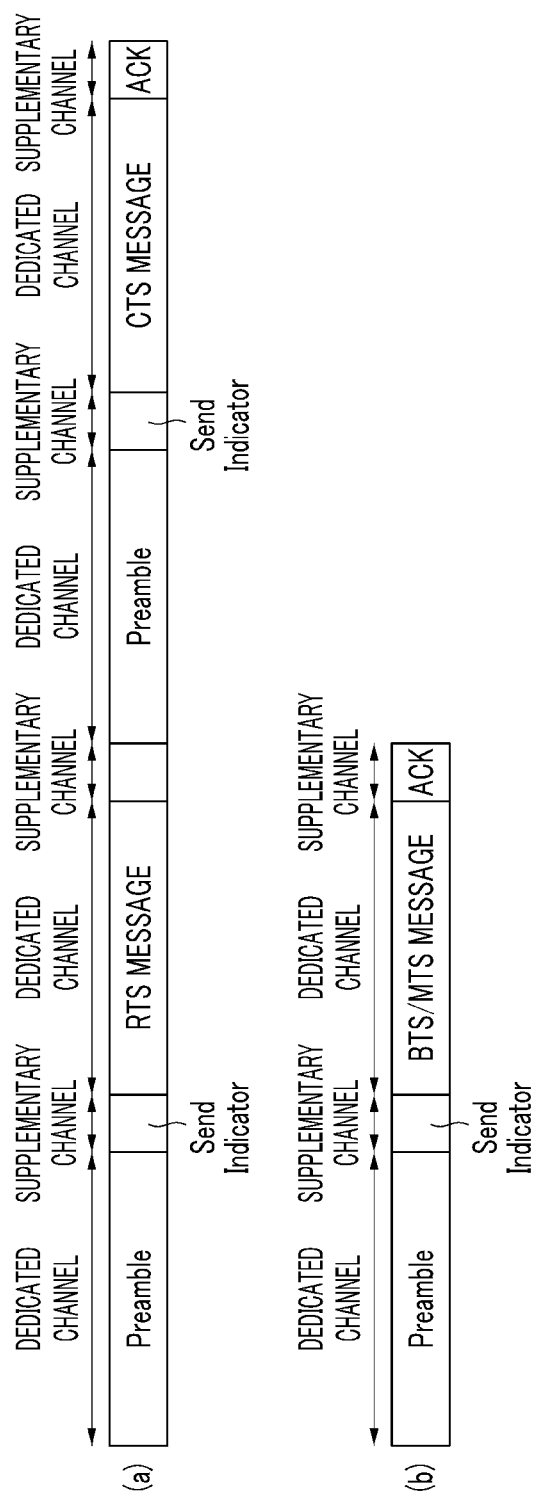
FIGS. 8A and 8B are diagrams illustrating an exemplary embodiment that occupies a resource of a dedicated channel in order to avoid interference.
Figure 8B:
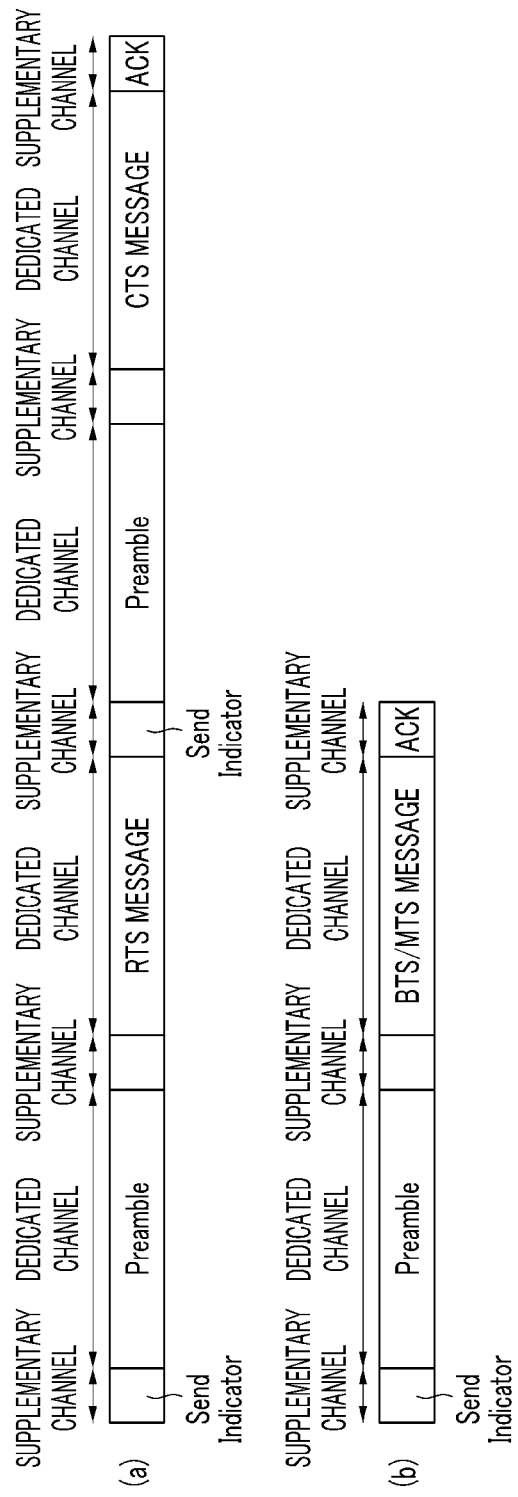

Data may be transmitted in a frame unit through the dedicated channel with an interference avoidance method according to an exemplary embodiment of the present invention, and in this case, as shown in FIGS. 8A and 8B, a resource of the dedicated channel and the supplementary channel may be used.

FIGS. 8A and 8B are diagrams illustrating an exemplary embodiment that occupies a resource of a dedicated channel in order to avoid interference.

As shown in FIG. 8A, in order to notify transmission of a preamble and an RTS message, a transmitting terminal transmits a send indicator through a supplementary channel. The supplementary channel is designed to transmit a codeword as a send indicator and transmits a send indicator, which is one code. The receiving terminal continues to detect a send indicator, and when the send indicator is detected, the receiving terminal receives a preamble and an RTS message. The receiving terminal sends a preamble and a CTS message through a dedicated channel, and in this case, the send indicator may be selectively included in a supplementary channel between the preamble and the CTS message.

As shown in FIG. 8A, in order to transmit data in a multicast or broadcast form, a send indicator is included in the supplementary channel between a preamble and a BTS or MTS message. The receiving terminal continues to detect the send indicator, and when the send indicator is detected, the receiving terminal receives a BTS message or an MTS message. Here, the receiving terminal may detect the send indicator, but may detect a preamble.

In FIG. 8A, after the receiving terminal detects the send indicator, in order to receive a preamble, the receiving terminal always stores a signal of a dedicated channel, and when the send indicator is detected, the receiving terminal uses the stored preamble.

Unlike the case of FIG. 8A, as shown in FIG. 8B, the send indicator may first be transmitted through the supplementary channel. The transmitting terminal transmits a send indicator, a preamble, and an RTS message, and the receiving terminal detects the send indicator and receives and uses a preamble signal. The receiving terminal transmits the send indicator, the preamble, and the CTS message. As shown in FIG. 8B, when the receiving terminal transmits data with a multicast or broadcast method, the send indicator is first transmitted through the supplementary channel.

Next, in order to a plurality of terminals that perform direct communication to avoid interference, a method of acquiring a use right of the limited number of dedicated channels with a distributed method will be described with reference to FIGS. 9 and 10. That is, as a method of allocating a dedicated source to a terminal that participates in direct communication, a terminal that is located at an area of a signal that the terminal transmits does not receive another signal, and a terminal that is located at an area that can receive a signal and does not transmit a signal.

Figure 9:
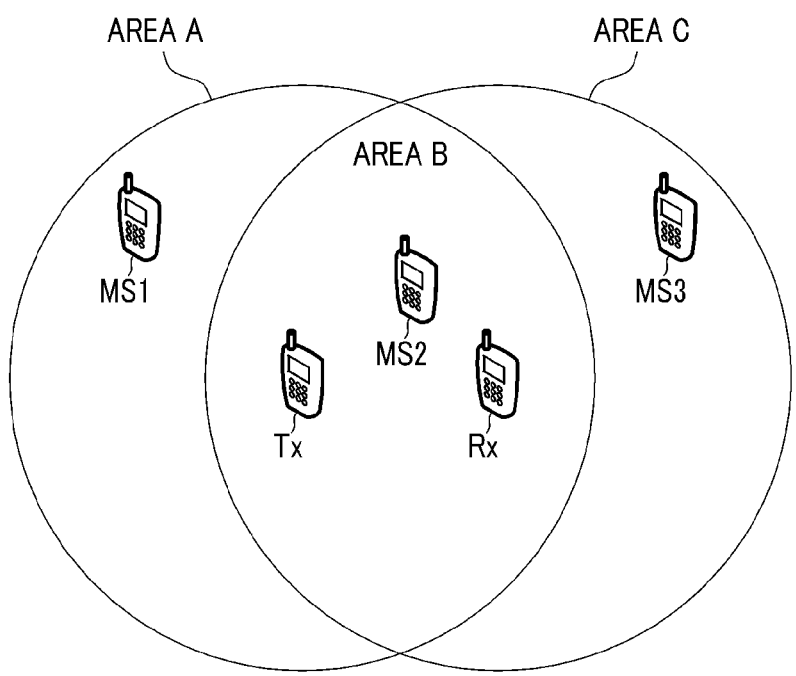
FIG. 9 is a diagram illustrating a method of allocating a resource in order to avoid interference in one-to-one communication.

FIG. 9 is a diagram illustrating a method of allocating a resource in order to avoid interference in one-to-one communication.

In FIG. 9, an area that is influenced by a transmitted/received signal between a transmitting terminal Tx and a receiving terminal Rx that participate in direct communication occurs, and thus terminals in a corresponding area receive an influence of mutual interference. An area A is influenced by a transmitting signal of the transmitting terminal Tx, the receiving terminal Tx is influenced by an area C, and an area B is an overlapped area of the area A and the area C.

In order to avoid interference, a terminal MS1 within the area A does not receives another signal (i.e., a transmitted/received signal between the transmitting terminal and the receiving terminal), and a terminal MS3 within the area C does not transmit another signal. Further, a terminal MS2 within the area B does not transmit and receive another signal.

Here, a procedure that allocates a resource is performed by exchanging an RTS message and a CTS message between the transmitting terminal Tx and the receiving terminal Rx. That is, an allocation procedure of the dedicated channel is performed by exchanging an RTS message and a CTS message through the supplementary channel and the dedicated channel. The transmitting terminal Tx transmits an RTS message by selecting an unused dedicated channel, and the receiving terminal Rx transmits the CTS message through the dedicated channel and the supplementary channel. When the transmitting terminal Tx successfully receives the CTS message, the transmitting terminal Tx and the receiving terminal Rx occupy and use a corresponding dedicated channel.

Figure 10:
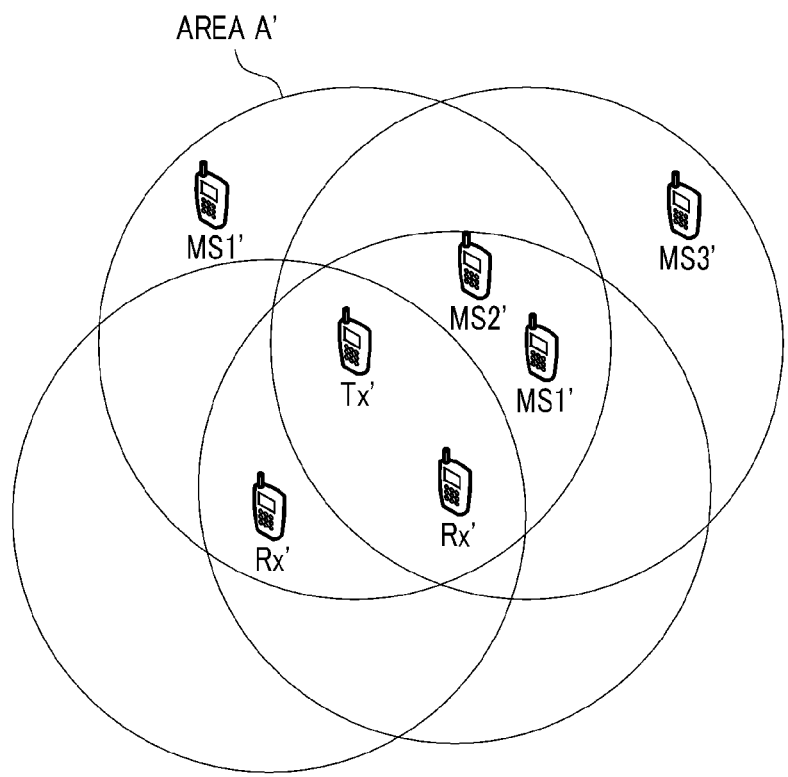
FIG. 10 is a diagram illustrating a method of allocating a resource in order to avoid interference in one-to-many communication.

FIG. 10 is a diagram illustrating a method of allocating a resource in order to avoid interference in one-to-many communication.

As shown in FIG. 10, a plurality of terminals participate in direct communication between terminals, one transmitting terminal Tx' transmits data is one, and multiple receiving terminals Rx' that receive data exist (three in FIG. 10). An area A' is an area that a signal that is transmitted by the transmitting terminal Tx' influences, and a plurality of receiving terminals Rx' are located within the area A' that the transmitting signal influences. Areas (represented by circles in FIG. 10) other than the area A' are areas that a signal that is transmitted by each receiving terminal Tx' influences.

In order to avoid interference, each receiving terminal Rx' performs the following procedure so that terminals other than the transmitting terminal Tx' do not transmit in the area A'.

A terminal that participates in one-to-many communication exchanges an RTS message and a CTS message as a procedure that allocates a resource. The transmitting terminal Tx' transmits an RTS message, and a plurality of receiving terminals Rx' having received the RTS message transmit a CTS message or an ACK message. Here, a plurality of CTS messages or a plurality of ACK messages that are transmitted by the plurality of receiving terminals Rx' are transmitted to the transmitting terminal Tx' at the same location. In one-to-many communication, a dedicated channel allocation procedure is similar to a dedicated channel allocation procedure in one-to-one communication, and the procedure is formed so that the receiving terminal Rx' performs the same procedure. However, one-to-many communication is different from one-to-one communication in that a plurality of receiving terminals Rx' exist and thus the transmitting terminal Tx' simultaneously receives a plurality of CTS messages.

Information that the transmitting terminal Tx' acquires from the received plurality of CTS messages includes the following two. First, when the transmitting terminal Tx' receives a CTS message, CTS messages that are transmitted from each receiving terminal Rx' are the same and operation in a condition in which a time is synchronized is considered. Next, when the transmitting terminal Tx' does not receive a CTS message, the transmitting terminal Tx' detects strength of a received signal and determines whether the CTS message signal exists. Here, when the transmitting terminal Tx' receives a CTS message or detects a CTS message signal, the transmitting terminal Tx' uses a corresponding dedicated channel with a one-to-many communication method. When the transmitting terminal Tx' does not receive a CTS message or does not detect a CTS message signal, the transmitting terminal Tx' cannot use a corresponding dedicated channel with a one-to-many communication method.

When a dedicated channel is allocated with a one-to-many communication method, if the transmitting terminal Tx' transmits data through the allocated dedicated channel, the receiving terminal Rx' transmits an ACK message through a supplementary channel. Other terminals MS1', MS2', and MS3' in a receivable area of a signal (a signal of an ACK message) that is transmitted through the supplementary channel may know from the signal that a corresponding dedicated channel has been used.

In the foregoing description, for one-to-many communication, a case in which a CTS message is used has been described, but a case of using a broadcast indicator instead of the CTS message will also be described.

In order to allocate a resource, the transmitting terminal Tx' transmits an MTS message. Each of a plurality of receiving terminals Rx' having received the MTS message transmits a broadcast indicator through a supplementary channel. Here, an ACK message is used as a broadcast indicator. A broadcast indicator that is transmitted from each receiving terminal Rx' is received in the same slot, and because a plurality of receiving terminals Tx' exist, the transmitting terminal Tx' simultaneously receives the broadcast indicator.

The transmitting terminal Tx' having simultaneously received a plurality of broadcast indicators determines whether a broadcast indicator signal exists by detecting strength of a received signal. When the transmitting terminal Tx' detects a broadcast indicator signal, the transmitting terminal Tx' uses a corresponding dedicated channel with a one-to-many communication method. However, when the transmitting terminal Tx' does not detect a broadcast indicator signal, the transmitting terminal Tx' does not use a dedicated channel with a one-to-many communication method.

When the transmitting terminal Tx' transmits data through an allocated dedicated channel with a one-to-many communication method, the receiving terminal Rx' transmits a broadcast indicator through a supplementary channel. Other terminals MS1', MS2', and MS3' in a receivable area of a signal that is transmitted through the supplementary channel may know from the signal that a corresponding dedicated channel has been used.

As one-to-many communication, broadcasting-type transmission, which is a method in which the transmitting terminal Tx' transmits to all terminals, may be used. In broadcasting-type transmission, the transmitting terminal Tx' transmits a BTS message instead of an MTS message to all terminals. Procedures between the transmitting terminal and the receiving terminal that are related to broadcasting-type transmission are similar to procedures using the MTS message that are described in the foregoing description. However, all terminals (three Rx's, MS1', and MS2' in FIG. 10) that receive a signal are receiving targets of the BTS message, but a preset receiving terminal (of three Rx's in FIG. 10) may be a receiving target of the MTS message.

A MAC control message may be included in an RTS message, a CTS message, an MTS message, and a BTS message that are used in a resource allocation procedure that is described with reference to FIGS. 9 and 10. In order to use the MAC control message, a MAC message indicator is added to the RTS message, the CTS message, the MTS message, and the BTS message, and represents whether a control message exists. That is, when the MAC message indicator is set, the MAC control message is added and transmitted, and the MAC message indicator represents whether a MAC control message to be transmitted therewith exists. The MAC message indicator includes an indicator field and a message kind field, and the MAC control message is a message to be used in a procedure to be operated together with a procedure that allocates a dedicated channel.

In a direct communication method according to an exemplary embodiment of the present invention, in order to restore a data error, a hybrid automatic repeat request (hereinafter referred to as a "HARQ") method is used.

In data transmission, in order to apply a HARQ function, the receiving terminal transmits a NAK message through a supplementary channel in order to notify that an error has occurred in a received signal. In this case, the transmitting terminal, having received the NAK message again transmits data in which an error has occurred, and the receiving terminal, having received the message, has a previously stored signal (a signal in which an error has occurred) as well as a retransmitted signal together.

In more detail, the receiving terminal transmits a NAK message representing that an error has occurred in a received signal to the transmitting terminal, and the NAK message includes a field representing frame information (a location of data in which an error has occurred) of an error that has occurred. Here, the receiving terminal transmits a NAK message within a preset time after a data frame in which an error has occurred. In order to transmit an error signal again, the transmitting terminal stores data for a preset time, and when the transmitting terminal receives a NAK signal, the transmitting terminal retransmits data of a corresponding frame. The transmitting terminal may retransmit an error signal in a next dedicated channel resource instead of retransmitting an error signal while receiving the NAK signal, and this is to transmit additional information having higher priority than the NAK message when using a supplementary channel. The transmitting terminal retransmits previously stored data and deletes the data after a preset time.

In a direct communication method according to an exemplary embodiment of the present invention, the receiving terminal performs a channel quality information (CQI) report function and a feedback transmission function with a supplementary channel, and the transmitting terminal performs a modulation and coding scheme (MCS) change as a CQI report procedure, and hereinafter, this will be described.

Figure 11:
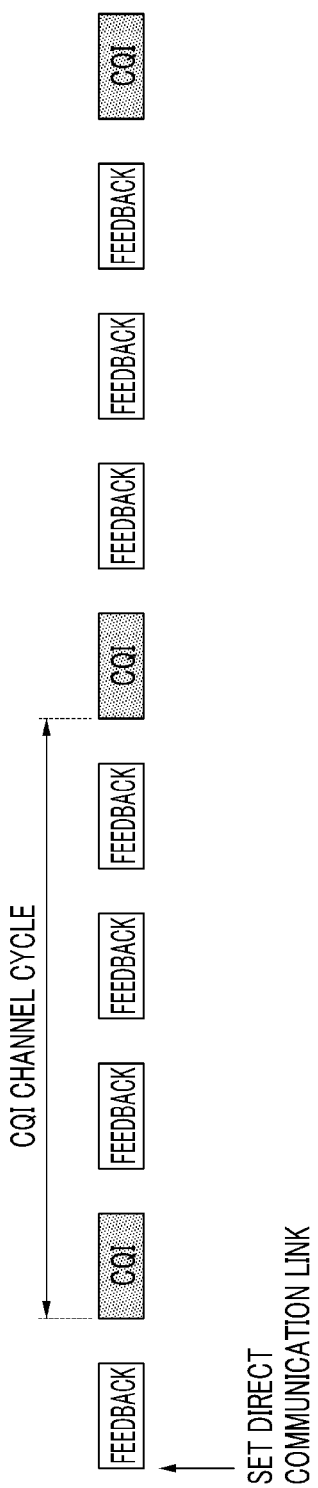
FIG. 11 is a diagram illustrating a method in which a receiving terminal periodically performs a CQI report through a supplementary channel.

FIG. 11 is a diagram illustrating a method in which a receiving terminal periodically performs a CQI report through a supplementary channel.

The receiving terminal receives data through a dedicated channel, and performs a CQI report function and a feedback transmission function through a supplementary channel. As shown in FIG. 11, for a CQI report function, the receiving terminal first transmits CQI information through a supplementary channel corresponding to a dedicated channel and transmits feedback through the remaining supplementary channels. In such a method, a CQI report function has a priority. The transmitting terminal and the receiving terminal previously exchange a CQI channel at a signal procedure, and thereafter, the receiving terminal periodically transmits CQI information to the transmitting terminal. That is, the CQI channel may be allocated at a direct communication link procedure, and in this case, a field representing a cycle and a location of the CQI channel may be formed. As feedback information, an ACK message, a NAK message, a modulation and coding scheme (MCS) change command message, and RCHG Ind may be used.

Unlike a method of FIG. 11 that is described in the foregoing description, a receiving terminal randomly transmits CQI information instead of transmitting at a fixed cycle and location. That is, CQI information is formed as part of feedback information. An identifier representing a kind of feedback information is included in the feedback information, and CQI information becomes part of feedback information. In this case, the receiving terminal transmits a specific feedback information kind from feedback information to transmit according to priority determination, and after transmission is determined, the receiving terminal also transmits CQI information. When the transmitting terminal receives the specific feedback information kind through a supplementary channel, the transmitting terminal identifies a feedback information kind identification field and determines a feedback kind. That is, when the transmitting terminal identifies a feedback information kind field representing CQI information and a corresponding value, the transmitting terminal receives CQI information.

In order to synchronize frames that transmit CQI, a method of managing a frame number on each connection basis may be used. After a direct connection is set, a frame number on a connection basis is set, the transmitting terminal and the receiving terminal manage such a frame number on a connection basis, and whenever a frame increases, the transmitting terminal and the receiving terminal manage the frame number while increasing one by one. Here, an internal frame number may be set to 24 bits. Alternatively, a method in which the transmitting terminal transmits a frame number to the receiving terminal and in which the receiving terminal synchronizes a frame number may be used.

Next, as a CQI report procedure, a method in which the transmitting terminal changes MCS will be described.

The transmitting terminal determines an MCS level based on collected data reception performance and transmits the MCS level through a dedicated channel. A form that is transmitted through the dedicated channel may be formed in a subheader form of a MAC packet data unit (PDU) or a MAC control message.

In order to change the MCS, the transmitting terminal transmits an MCS change command message to the receiving terminal, and the receiving terminal transmits an MCS change confirm message to the transmitting terminal with feedback information of a supplementary channel. When the transmitting terminal receives the MCS change confirm message, the transmitting terminal determines that an MCS change is complete, and thereafter, the transmitting terminal transmits data that is transmitted to the dedicated channel by applying the changed MCS.

In order to overcome a procedure that changes the MCS and an error of an MCS change command message and an MCS change confirm message, after the receiving terminal receives an MCS change command message, until the receiving terminal successfully receives data with the changed MCS, the receiving terminal attempts to receive data with both previous the MCS and a new MCS.

In a direct communication method according to an exemplary embodiment of the present invention, for periodic ranging between the transmitting terminal and the receiving terminal, a preamble is exchanged through a dedicated channel.

Figure 12:
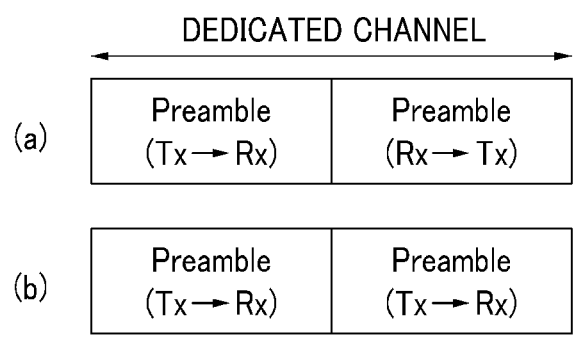
FIG. 12 is a diagram illustrating an example in which a dedicated channel is used as a preamble for ranging.

FIG. 12 is a diagram illustrating an example in which a dedicated channel is used as a preamble for ranging.

As shown in FIG. 12, a data portion of the dedicated channel is divided into two portions and thus a preamble is formed in a bi-directional way. As shown in a of FIG. 12, a transmitting terminal Tx that performs one-to-one communication transmits a preamble in a portion of an area of the dedicated channel, and a receiving terminal Tx transmits a preamble in another area. As shown in b of FIG. 12, the transmitting terminal Tx that performs one-to-many communication transmits a preamble in all of a portion of the area and another area.

Figure 13:
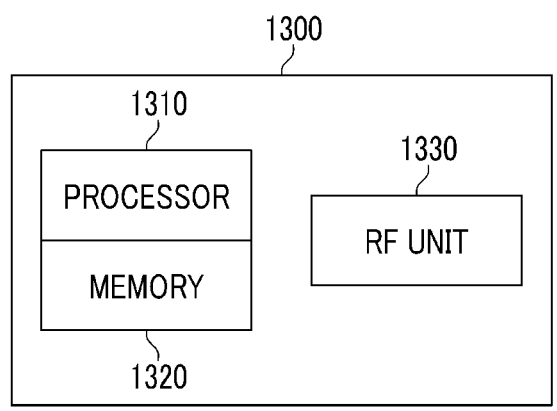
FIG. 13 is a block diagram illustrating a configuration of a terminal that performs direct communication between terminals according to an exemplary embodiment of the present invention.

FIG. 13 is a block diagram illustrating a configuration of a terminal that performs direct communication between terminals according to an exemplary embodiment of the present invention.

Referring to FIG. 13, a terminal 1300 includes a processor 1310, a memory 1320, and a radio frequency (RF) unit 1330. The processor 1310 is formed to embody a procedure and/or method that is suggested in the present invention. The memory 1320 is connected to the processor 1310 and stores various information parts that are related to operation of the processor 1310. The RF unit 1330 is connected to the processor 1310 and transmits and/or receives a wireless signal. The terminal 1300 may have a single antenna or multiple antennas.

According to such an exemplary embodiment of the present invention, in direct communication between terminals, a plurality of terminals can propagate a reference time with a distributed method and acquire synchronization.

According to an exemplary embodiment of the present invention, in direct communication between terminals, a method of occupying a resource of a dedicated channel with a distributed method is provided, and in one-to-one communication and one-to-many communication, by occupying a resource of a dedicated channel with a distributed method, interference between terminals can be avoided.

Further, according to an exemplary embodiment of the present invention, in direct communication between terminals, a hybrid automatic repeat request (HARQ) method is provided, and a channel quality indicator (CQI) report and an MCS change procedure are provided.

The foregoing exemplary embodiment of the present invention may be not only embodied through an apparatus and method but may also be embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of communicating, the method comprising, by a receiving terminal:
   receiving a plurality of synchronization information parts;
   selecting synchronization information to acquire a reference time from among the plurality of synchronization information parts according to a priority order; and
   acquiring the reference time through the selected synchronization information,
   wherein the priority order assigns a first priority to first synchronization information that is received from a base station, a second priority to second synchronization information that is received from a global positioning system (GPS), and a third priority to third synchronization information that is received from a transmitting terminal, wherein the third priority is based at least partly on a hop count to the transmitting terminal from the base station or the GPS.

2. The method of claim 1, wherein the third priority is higher for third synchronization information received from a first terminal than for third synchronization information received from a second terminal having a same hop count from the base station or GPS as the first terminal if a received signal strength of the first terminal is higher than a received signal strength of the second terminal.

3. The method of claim 2, wherein the third synchronization information received from the first terminal comprises a type of the reference time, the hop count of the first terminal, and the received signal strength of the first terminal.

4. The method of claim 1, wherein the priority order assigns a fourth priority to fourth synchronization information that is randomly selected.

5. The method of claim 4, further comprising acquiring a reference time by selecting a regional time corresponding to a region of the receiving terminal when the first to fourth synchronization information parts are not acquired within a predetermined time.

6. A method of communicating, the method comprising, by a transmitting terminal:
   acquiring a reference time through first synchronization information transmitted by a first terminal;
   measuring received signal strength from the first synchronization information;
   receiving second synchronization information corresponding to a hop count that is larger by one hop count than a hop count corresponding to the first synchronization information; and
   transmitting third synchronization information when the received signal strength is smaller than a strength field value of a received signal that is included in the second synchronization information.

7. The method of claim 6, further comprising transmitting the third synchronization information when the second synchronization information is not received.

8. The method of claim 6, wherein a strength field value of the received signal is received signal strength of synchronization information that a terminal that transmits the second synchronization information uses for acquiring synchronization information.

9. The method of claim 6, wherein the third synchronization information comprises a hop count, received signal strength, and a reference time type.

* * * * *